March 6, 1962 R. R. BIRNBACH ET AL 3,024,342
UTENSIL
Filed Sept. 13, 1960
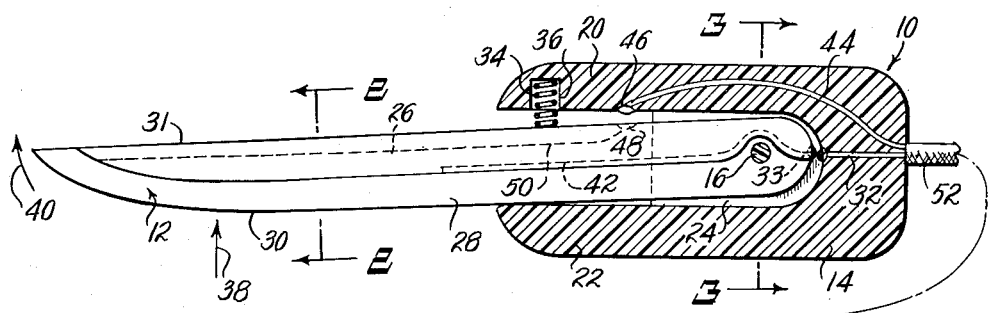
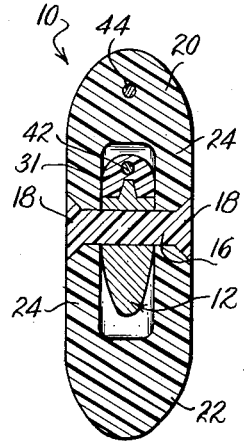
INVENTORS
Richard R. Birnbach
Elliott Millner
BY Arnold G. Gulko
ATTORNEY

United States Patent Office 3,024,342
Patented Mar. 6, 1962

3,024,342
UTENSIL
Richard R. Birnbach, 10 Cascade Terrace, Yonkers, N.Y., and Elliott Millner, 16 Wildwood Road, Hartsdale, N.Y.
Filed Sept. 13, 1960, Ser. No. 55,688
4 Claims. (Cl. 219—21)

The present invention relates to electrically heated knives adapted for use with greater convenience and safety.

The use of heated blades to facilitate cutting various products, especially frozen products such as frozen meats and frozen vegetables, is known. While electrical resistance heating and other expedients are available for heating the blade of a knife, these are of only limited utility, because the hot blade is a constant source of danger, both to person and property. The mere presence of switches with electrical heating systems, while helpful, does not solve the problem, for one must remember to turn the switch on or off, or to observe some special precaution in the use or storage of the knife.

In accordance with the present invention, an electrically heated knife blade is pivotally secured to the handle in a manner permitting the handle to support or back-up the blade when cutting pressure is applied and electrical circuit means are provided which remain open except when the knife is used for cutting, in which event, the electrical circuit automatically closes to permit the cutting edge of the blade to be heated.

The invention will be more fully described in connection with the accompanying drawings in which:

FIG. 1 is a longitudinal cross-section taken through a knife constructed in accordance with the invention;

FIG. 2 is a cross-section taken on line 2—2 of FIG. 1; and

FIG. 3 is a cross-section taken on line 3—3 of FIG. 1.

Referring to the drawings, the electrically heated knife 10 includes a blade 12 and a handle 14, the blade being pivoted to the handle by a suitably insulated pin 16 which is secured to the handle 14 by headed portions 18 shown in FIG. 3.

The handle 14 is desirably formed of molded electrically insulating and heat-resistant plastic and desirably includes upper and lower portions 20 and 22 limiting pivotal movement of blade 12 and side members 24 which confine the blade against lateral movement.

The blade 12 includes electrical resistance elements 26, a cutting element 28 having a cutting edge 30 and an electrically insulating and heat-resistant housing 31, desirably formed of plastic, which holds the heating elements 26 in place and combines the heating elements and cutting element together to form the unitary blade 12.

The electrically heated blade shown in FIG. 2 represents a preferred blade construction, but the blade itself is not considered to be novel and the invention is not limited to any specific structural combination of the cutting and electrical resistance heating elements. The cutting edge of the blade may be serrated in whole or in part as may be preferred for the utility contemplated.

In the invention, the blade is mounted in the handle to be movable automatically upon the application of cutting force from a first normal position shown in FIG. 1 in which the electrical circuit to the heating elements 26 is open, to a second position in which the circuit is closed. To insure that the first open position will be the normal position, the blade is biased to cause it to move into the first circuit-open position. In the form of the invention shown in FIG. 1, a coil spring 34 is mounted under compression in a socket 36 formed in the upper portion 20 of the handle 14. When a cutting force indicated by arrow 38 is applied to the cutting edge 30, the blade 12 is forced to pivot about pin 16 as indicated by arrow 40 and this compresses the spring 34 into its mounting socket 36 as the blade 12 pivots into its second and circuit-closing position.

A pivotal securement between the blade 12 and the handle 14 is preferred for this enables economical and secure construction and is well adapted to permit the desired blade movement with minimum danger that the blade will become jammed or incapable of movement and because it insures reliable closing of the normally open electrical circuit.

The electrical circuit for the heating elements 26 is an open circuit carried by the handle 14 and includes two electrical lines. A first electrical line 32 supplies electrical current to directly connect with one terminal 33 which is electrically connected with heating element 26 by means of electrical line 42 carried through housing 31 of blade 12. A second electrical line 44 terminates in a contact 46 carried by the handle 14 in the path of another terminal 48 carried by the blade 12 and which is electrically connected with heating element 26 by means of electrical line 50 carried through housing 31 to complete the electrical circuit. The lines 32 and 44 in handle 14 join together in power line 52 which leads to an electrical plug 54. If desired, the lines 32 and 44 may terminate in contacts extending into a recess in the rear of the handle, the power line 52 and plug 54 being separate as is a common manner of supplying electrical current to common household electrical appliances.

The first line 32 may be formed as a single line directly connected with terminal 33, as shown, with a small extra length extending between the rear of the blade and the handle to permit limited pivotal movement of the blade, or various obvious alternatives may be used. For example, terminal 33 may be a contact slidingly engaged by a member extending from the line 32, or a normally open contact arrangement similar to that proposed for terminal 48 with contact 46 may be arranged. As will be apparent, the specific electrical circuit used forms no part of the invention and other complexities such as a light to indicate the fact of heating, or that the device is connected to a source of elecrical power, are easily arranged as by employing a neon bulb in parallel across the electrical lines 32 and 44.

The handle 14 is desirably shaped as shown in FIG. 3 to provide broad flat sides and narrow sharply curved top and bottom surfaces to insure that the knife will be deposited on its side when it is placed on a flat surface for storage. The handle 14 is desirable dimensioned and weighted to insure that the blade 12 will be elevated away from a flat supporting surface when the knife is rested on its side.

Various modifications will be immediately apparent to those skilled in the art, the invention being defined in the claims which follow.

We claim:

1. An electrically heated knife comprising a handle and a blade having a cutting edge and electrical resistance heating means for heating said edge, said blade including a pair of terminals electrically connected with said heating means for supplying an electrical current thereto, said blade being pivotally secured to said handle and said handle surrounding the rear of said blade to provide support for said blade when cutting pressure is applied to the edge thereof, biasing means normally forcing said blade away from a position in which said handle supports said blade for cutting, an open electrical circuit carried by said handle including a first electrical line for suplying an electrical current to one of said terminals and a second electrical line terminating in contact means carried by said handle in the path of the other of said pair of terminals whereby pivotal movement of said blade with respect to said handle, when cutting pressure is applied to overcome said biasing means, will move said other terminal against said contact means to close the electrical circuit to said heating means and thereby heat the cutting edge of said blade only so long as cutting pressure is maintained.

2. An electrically heated knife as recited in claim 1 in which said handle includes upper and lower portions extending forwardly of the point of pivotal securement between said blade and said handle to limit pivotal movement of said blade.

3. An electrically heated knife as recited in claim 1 in which said handle is formed with broad flat sides and sharply curved top and bottom surfaces to insure that the knife will rest on its side when deposited upon a flat surface.

4. An electrically heated knife as recited in claim 3 in which said handle is dimensioned and weighted to support the blade in elevated position above a flat surface upon which said knife is rested on its side.

References Cited in the file of this patent

UNITED STATES PATENTS

| | | |
|---|---|---|
| 1,744,720 | Blackburn | Jan. 28, 1930 |
| 1,850,280 | Haynes | Mar. 22, 1932 |
| 1,985,734 | La Porte | Dec. 25, 1934 |
| 2,179,326 | Eckman | Nov. 7, 1939 |
| 2,454,338 | Pityo et al. | Nov. 23, 1948 |
| 2,512,089 | Cervin | June 20, 1950 |
| 2,548,478 | Kavanagh | Apr. 10, 1951 |
| 2,866,068 | Bernstein et al. | Dec. 23, 1958 |